(12) United States Patent
Osborn et al.

(10) Patent No.: US 6,770,234 B2
(45) Date of Patent: Aug. 3, 2004

(54) HIGH TEMPERATURE POLYESTER FILM EXTRUSION

(75) Inventors: Kevin Paul Osborn, Statesville, NC (US); Larry H. McAmish, Cincinnati, OH (US)

(73) Assignee: Polymer Group, Inc., North Charleston, SC (US)

( * ) Notice: Subject to any disclaimer, the term of this patent is extended or adjusted under 35 U.S.C. 154(b) by 201 days.

(21) Appl. No.: 09/997,676

(22) Filed: Nov. 29, 2001

(65) Prior Publication Data

US 2002/0120046 A1 Aug. 29, 2002

Related U.S. Application Data

(60) Provisional application No. 60/250,636, filed on Nov. 30, 2000.

(51) Int. Cl.$^7$ .............................. C08J 3/20; C08L 67/00; B32B 27/08; B32B 27/36
(52) U.S. Cl. ........................ 264/169; 428/483; 524/504; 524/513; 523/319; 528/503
(58) Field of Search ........................... 428/483; 524/504, 524/513; 523/319; 528/503; 264/169

(56) References Cited

U.S. PATENT DOCUMENTS

| | | | | |
|---|---|---|---|---|
| 5,910,225 A | * | 6/1999 | McAmish et al. | 156/229 |
| 6,191,221 B1 | * | 2/2001 | McAmish et al. | 525/131 |
| 2003/0091765 A1 | * | 5/2003 | Ferrera et al. | 428/35.2 |

* cited by examiner

Primary Examiner—Tae H. Yoon
(74) Attorney, Agent, or Firm—Wood, Phillips, Katz, Clark & Mortimer

(57) ABSTRACT

The present invention is directed to the method of extruding a thermoplastic co-polyester EMA (ethyl methyl acrylate) blended film at temperatures well above the melt temperature of the base thermoplastic co-polyester, the co-polyester/EMA film having enhanced barrier properties. Notably, the present invention contemplates extrusion of co-polyester compounds onto suitable substrates without the need to employ antioxidant compounds in the molten polymer material. A further aspect of the present invention entails a film comprising an EMA and co-polyester thermoplastic admixed with a compatibilizer and extruded at a temperature at least 10% higher than the melt temperature, which in turn provides the co-polyester film with durable adhesive properties in addition to good breathability as measured by moisture vapor transmission rate (MVTR).

14 Claims, 4 Drawing Sheets

HIGH TEMPERATURE POLYESTER FILM EXTRUSION

This application claims benefit of a Provisional Application No. 60/250,636, filed on Nov. 30, 2000.

TECHNICAL FIELD

The invention herein is directed to a method whereby a co-polyester/ethyl methyl acrylate (EMA) film is maintained and extruded at temperatures well above the melt temperature of the film's base co-polyester polymer, the thermal stable nature of the co-polyester polymer during the extrusion process being imparted by a combination of one or more plastic compatibilizers, the resulting co-polyester film having enhanced physical barrier properties.

BACKGROUND OF THE INVENTION

The formation of finite thickness films from thermoplastic polymers is a well known practice. Thermoplastic polymer films can be formed by either dispersion of a quantity of molten polymer into a mold having the dimensions of the desired end product, known as a thermo-formed or injection-molded film, or by continuously forcing the molten polymer through a die, known as an extruded film. Extruded thermoplastic polymer films can either be formed such that the film is cooled then wound as a completed product, or dispensed directly onto a substrate material to form a composite material having performance of both the substrate and the film layers. Examples of suitable substrate materials include other films, polymeric or metallic sheet stock and woven or nonwoven fabrics.

The application of the extruded film directly onto a substrate material imparts the substrate material with enhanced physical properties. It is known in the art that the application of a thermoplastic polymer film having suitable flexibility and porosity onto a nonwoven fabric results in a composite material having significant barrier properties and is suitable for disposable protective garment manufacture.

To further improve the performance of the thermoplastic polymer film when used in composite material manufacture, various additives are admixed with the thermoplastic polymer prior to or during extrusion. Typical additives employed are those selected from various colorants or opacifiers, such as titanium dioxide. Water insoluble salts such as calcium carbonate may be added to the polymer mix resulting in a film that can be rendered micro-porous by the application of draft tension, as taught by U.S. Pat. No. 5,910,225, to McAmish. If there is a desire to form a composite wherein the thermoplastic polymer film will be exposed to a transitory temperature above the melting temperature of the polymer, antioxidants can be incorporated into the mix to aid in reducing thermal degradation. In the event where the family of thermoplastic polymers to be used in the extruded film exhibits a dissimilar characteristic such as surface energy from the thermoplastic polymer of the substrate material, compatibilizers are incorporated into the polymer mix.

Compatibilizers are crucial when attempting to form a composite material from film and substrate layers comprised of dissimilar polymers. Thermoplastic polymers used to form the film layer are heated to the respective melting point then applied uniformly to the substrate material. At the melting point of the thermoplastic polymer, the polymer has just reached the temperature at which the polymer phase transitions between solid and liquid states, and as such, exhibits a relatively high viscosity. When the highly viscous thermoplastic polymer is extruded onto the substrate material, the polymer extends only marginally into the interstices or pores of the substrate. The compatibilizer aids in attaining as much bond strength as possible with the marginal substrate surface contact.

One solution to obtaining a more durable adhesion of the film having a compatibilizer to the substrate material is to increase the pressure by which the film is extruded onto the substrate. Increasing the pressure of extrusion has a deleterious effect on both manufacture of the composite product and the quality of the film layer. The throughput of the line is necessarily reduced to allow for a higher residence time for the molten thermoplastic polymer to flow into the interstices of the substrate materials. An increase in pressure can also induce stress shearing in the polymer during extrusion, thus reducing the resulting durable performance of the thermoplastic polymer film.

While attempts have been made to attain durable adhesion between an extruded film and an associated substrate by temporarily increasing the extrusion temperature, thus reducing the polymer viscosity, an increase in the extrusion temperature ordinarily results in a discontinuous or broken polymer curtain, thus forming a product with regions of faulty or compromised composite structure. If the temperature is raised significantly, thermal degradation will further compromise the durable performance of the thermoplastic polymer. Heretofore, the use of antioxidants has been necessary to abate polymer degradation, with a corresponding disadvantageous effect on cost and compatibility with certain other desirable melt-additives.

There remains an unmet need for forming a composite material having an extruded thermoplastic polymer film whereby the film exhibits durable integration with the substrate material. Further, there remains an unmet need whereby the film can be extruded at a significantly elevated temperature which provides durable integration of the film with the substrate materials and can be performed without adversely affecting line speeds or polymer performance, without resort to the addition of expensive and typically unstable antioxidant compounds.

SUMMARY OF THE INVENTION

The present invention is directed to the method of extruding a thermoplastic co-polyester EMA (ethyl methyl acrylate) blended film at temperatures well above the melt temperature of the base thermoplastic co-polyester, the co-polyester/EMA film having enhanced barrier properties. Notably, the present invention contemplates extrusion of co-polyester compounds onto suitable substrates without the need to employ antioxidant compounds in the molten polymer material.

A further aspect of the present invention entails a film comprising an EMA and co-polyester thermoplastic admixed with a compatibilizer and extruded at a temperature at least 10% higher than the melt temperature, which in turn provides the co-polyester film with durable adhesive properties in addition to good breathability as measured by moisture vapor transmission rate (MVTR).

The thermal stability during processing of the thermoplastic co-polyester is imparted by the admixture of compatibilizers, the compatibilizers being incorporated to attain durable adhesion of the thermoplastic polymer film to a substrate material.

A particular embodiment of the present invention incorporates a co-polyester polymer base and a compatibilizer mix. Compatibilizers found suitable for use in high temperature extrusion of polyester include those selected from the group consisting of ethylene acrylate copolymers and maleic anhydride modified polyethylenes. The polyester admixture is extruded through a conventional film extruder at a temperature of between 500° F. and 560° F., a temperature significantly above the conventional extrusion maximum temperature of 450° F. employed by those skilled in the art.

The ethylene acrylate and maleic anhydride polyethylene compatibilizers are blended within the co-polyester and EMA melt at a 2:1 ratio. Preferably, the melt comprises 3% by weight maleic anhydride polyethylene and 1.5% by weight ethylene acrylate and more preferably, the melt comprises 1% by weight maleic anhydride polyethylene and 0.5% ethylene acrylate It is further contemplated by the present invention that a barrier fabric is formed from a base polyester polymer/compatibilizer admix which is extruded at a temperature of between 500° F. and 560° F. onto a polypropylene spunbond.

Other features and advantages of the present invention will become readily apparent from the following detailed description, the accompanying drawings, and the appended claims.

BRIEF DESCRIPTION OF THE DRAWINGS

The invention will be more easily understood by a detailed explanation of the invention including drawings. Accordingly, drawings which are particularly suited for explaining the invention are attached herewith; however, is should be understood that such drawings are for explanation purposes only and are not necessarily to scale. The drawings are briefly described as follows.

DETAILED DESCRIPTION

Figure 1:
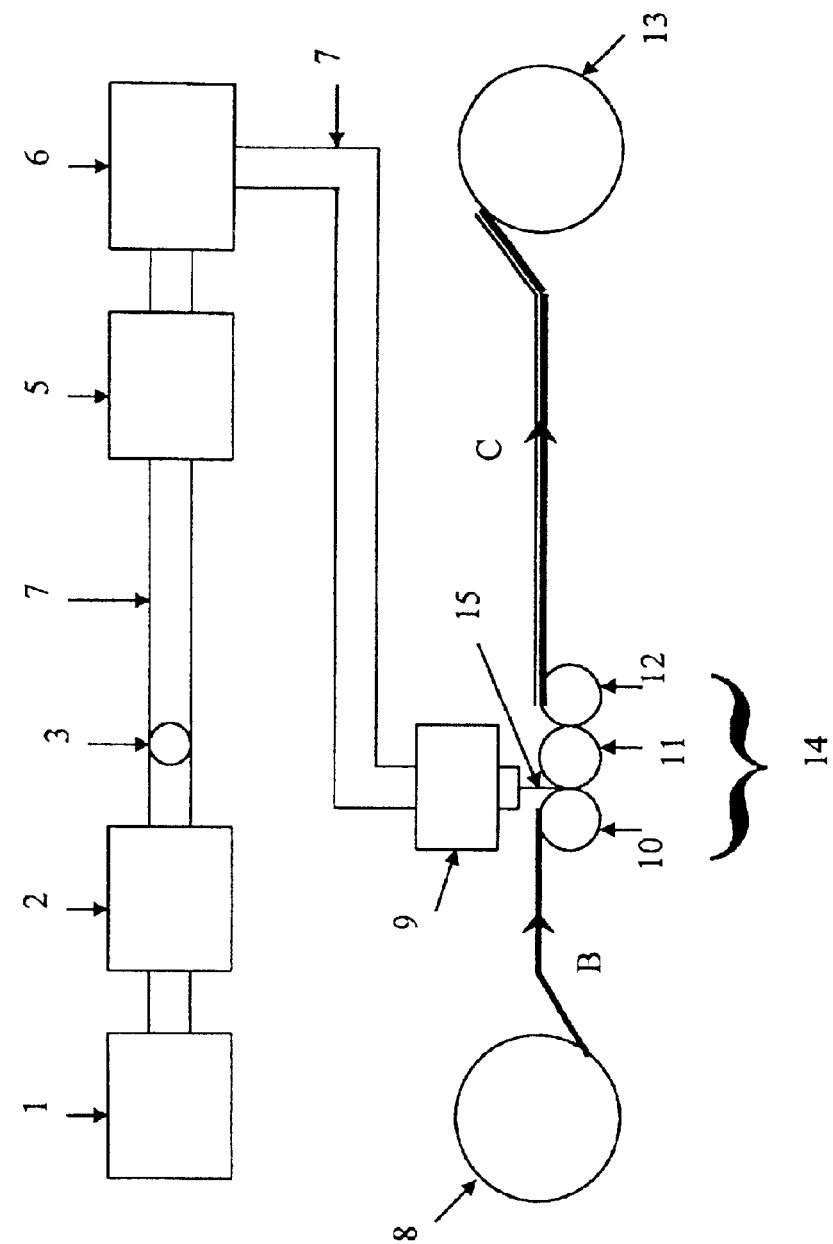
FIG. 1 is a schematic representation of the processing apparatus for producing an apertured film top sheet in accordance with the principles of the present invention.
Figure 2:
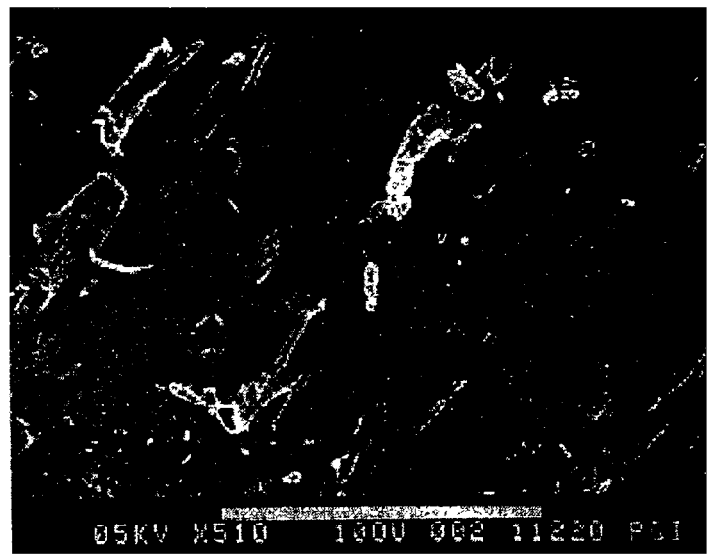
FIG. 2 is a photograph taken by a scanning electron microscope of Example 1 at approximately 500 × magnification
Figure 3:
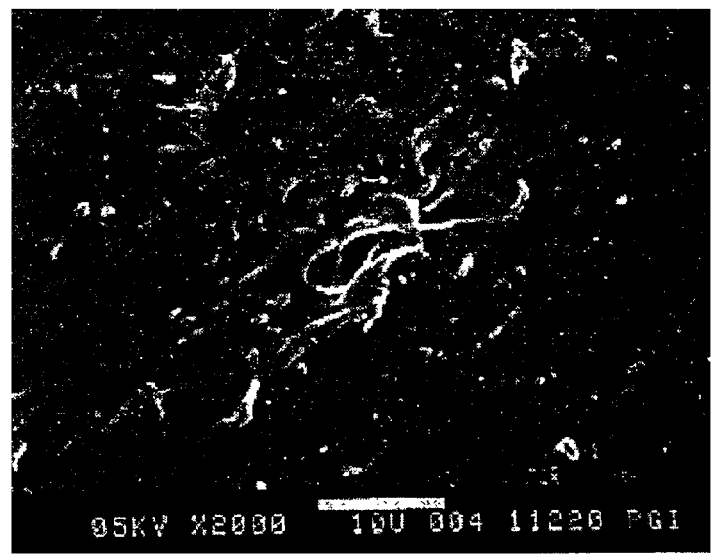
FIG. 3 is a photograph taken by a scanning electron microscope of Example 1 at approximately 2000 × magnification
Figure 4:
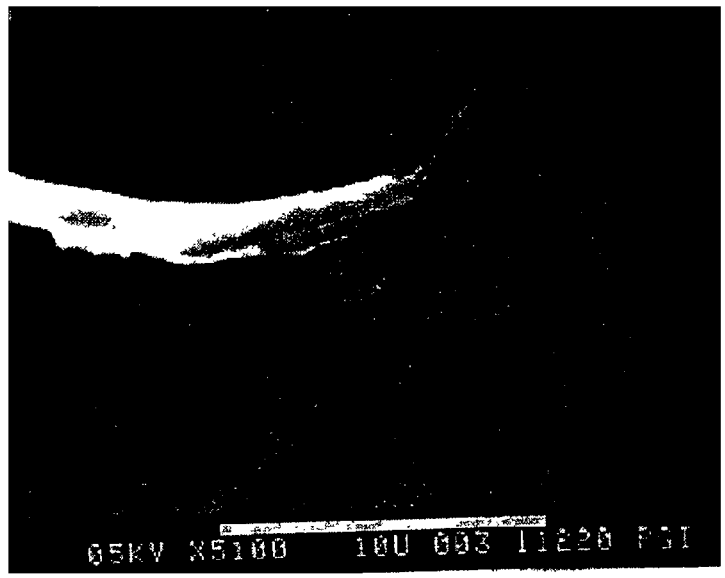
FIG. 4 is a photograph taken by a scanning electron microscope of Example 1 at approximately 5000 × magnification
Figure 5:
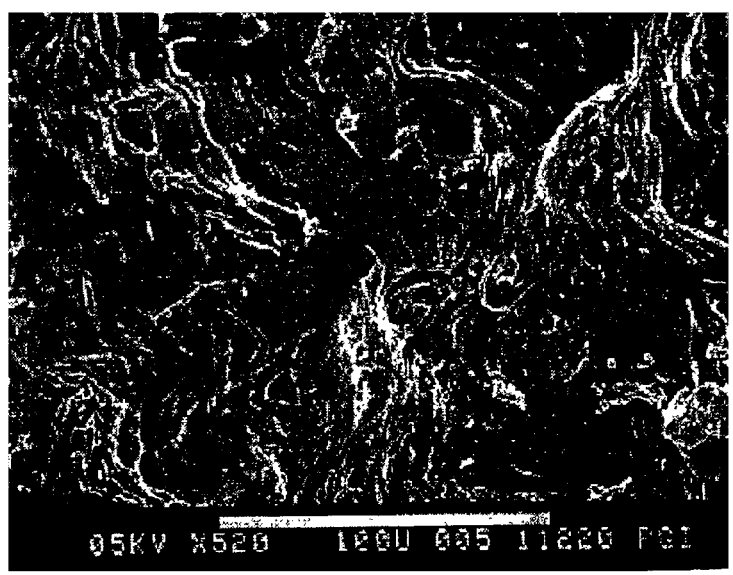
FIG. 5 is a photograph taken by a scanning electron microscope of Example 2 at approximately 500 × magnification
Figure 6:
FIG. 6 is a photograph taken by a scanning electron microscope of Example 2 at approximately 2000 × magnification
Figure 7:
FIG. 7 is a photograph taken by a scanning electron microscope of Example 2 at approximately 5000 × magnification

While the present invention is susceptible of embodiment in various forms, there is shown in the drawings and will hereinafter be described a presently preferred embodiment of the invention, with the understanding that the present disclosure is to be considered as an exemplification of the invention, and is not intended to limit the invention to the specific embodiment illustrated.

FIG. 1 depicts a representative direct extrusion film process. Blending and dosing system 1, comprising at least two hopper loaders for polymer chip and a mixing hopper. Variable speed augers within both hopper loaders transfer predetermined amounts of polymer chip and additive pellet to the mixing hopper. The mixing hopper contains a mixing propeller to further the homogeneity of the mixture. Basic volumetric systems such as that described are a minimum requirement for the blending zone system.

The polymer chip and additive pellet blend feeds into a multi-zone extruder 2 as supplied by the Wellex Corporation. In this particular system, a five zone extruder was employed with a 2 inch water-jacketed bore and a length to diameter ratio of 24 to 1.

Upon mixing and extrusion from multi-zone extruder 2, the polymer compound is conveyed via heated polymer piping 7 through screen changer 3, wherein breaker plates having different screen meshes are employed to retain solid or semi-molten polymer chips and other macroscopic debris. The mixed polymer is then fed into melt pump 5.

Melt pump 5 operates in dynamic feed back with the multi-zone extruder 2 to maintain the desired pressure levels. A gear-type melt pump was employed to respond to pressure levels by altering the speed of the extruder to compensate for deviations from the pressure set point window.

The metered and mixed polymer compound then enters combining block 6. The combining block allows for multiple film layers to be extruded, the film layers being of either the same composition or fed from different systems as described above. The combining block 6 is directed into die body 9 by additional heated polymer piping 7.

The particular die body 9 employed in this system is a 37 inch wide EDI Automatic Die with die bolt control as supplied by EDI. The die body 9 is positioned in an overhead orientation such that molten film extrusion 15 is deposited at the nip point in cast station 14, between nip roll 10 and cast roll 11.

When a substrate in the form of base layer annotated as B is to receive a film layer extrusion, a base layer source is provided in roll form to a tension-controlled unwinder 8. The base layer is unwound from unwinder 8 and moves over nip roll 10, the nip roll having an ambient temperature "HYPALON" rubber facing. The molten film extrusion 15 from die body 9 is deposited onto base layer B at the nip point between nip roll 10 and cast roll 11, the cast roll having a chilled matte finished chrome facing. The newly formed base layer and film composite, annotated as C, is then removed from cast roll 11 by stripper roll 12, the stripper roll having a chilled polished chrome facing. The composite material C is then wound onto a new roll at variable-speed winder 13.

It is contemplated that the polymer melt include no significant quantity of an antioxidant to facilitate efficient and cost-effective formation of the composite material that can be formed in accordance with the present invention. However, it will be recognized that many base polymeric material will typically have some small quantity of residual antioxidant compound inherent to the polymer formation process. Accordingly, the present invention contemplates that any antioxidant which is present comprise no more than about 1%, by weight, and preferably no more than 0.1% of the extruded polymer melt.

EXAMPLES

Example 1

A system as described in FIG. 1 was used to form a control co-polyester film having no compatibilizers. The co-polyester polymer blend was comprised of the following:

| | |
|---|---|
| Lotryl 20MA08 [an ethyl methyl acrylate] | 65% (w/w) |
| As supplied and registered to the Atofina Co. of Italy. | |
| DSM PL380 [a co-polyester] | 35% (w/w) |
| As supplied and registered to Dutch State Mining Company. | |

The five zone extruder was operated with each successive zone at 350° F., 450° F., 485° F., 525° F., and 515° F. A base material was supplied in the form of a prewound roll of 85 gram per square meter (gsm) spunbond polypropylene having been previously hot calendered with a 14% land area pattern. The melt temperature of the molten film extrusion was 477° F. The cast station temperatures were 80° F. for the nip roll, 65° F. for the cast roll, and 70° F. for the stripper roll. The cast station roll pressures were 75 pounds per square inch for the nip roll and 60 pounds per square inch for the stripper roll. Overall line speed during the processing of this material was 51 feet per minute.

Example 2

A modified co-polyester film composite was fabricated, the co-polyester/EMA film containing compatibilizers and produced by the principles of the current invention. The co-polyester polymer blend was comprised of the following:

| | |
|---|---|
| Lotryl 20MA08 | 63.5% (w/w) |
| DSM PL380 | 35% (w/w) |
| FUSABOND E [maleic anhydride modified polyethylene] | 1% (w/w) |
| As supplied and registered to the Du Pont Company of Mississauga, CA. | |
| ELVALOY [ethylene acrylate] | 0.5% (w/w) |
| As supply and registered to the Du Pont Company of Wilmington, DE. | |

The five zone extruder was operated with each successive zone at 350° F., 465° F., 500° F., 540° F., and 530° F. A base material as described above was supplied on a prewound roll. The melt temperature of the molten film extrusion was 494° F. The cast station temperatures were 80° F. for the nip roll, 65° F. for the cast roll, and 70° F. for the stripper roll. The cast station roll pressures were 65 pounds per square inch for the nip roll and 40 pounds per square inch for the stripper roll. Overall line speed during the processing of this material was 51.5 feet per minute.

The ethylene acrylate and maleic anhydride polyethylene compatibilizers are blended within the co-polyester and EMA melt at a 2:1 ratio. Preferably, the melt comprises 3% by weight maleic anhydride polyethylene and 1.5% by weight ethylene acrylate and more preferably, the melt comprises 1% by weight maleic anhydride polyethylene and 0.5% ethylene acrylate.

Physical Test Procedures
  Moisture Vapor Transmission Rate

A sample is weighed and placed along with a predetermined amount of Calcium Chloride into a Self Contained Humidity and Temperature Chamber for a predetermined amount of time. Once the sample is removed, it sets for a predetermined amount of time and is weighed for a second time. The difference in the sample weight is manipulated in a formulation, which results in the moisture vapor transition rate of the sample.

Results of physical testing are found in TABLE 1. It can be seen that the co-polyester film having the incorporated compatibilizers has a higher MVTR rating. This is of particular interest as not only was the co-polyester/EMA compound maintained at a higher extrusion temperature for a longer duration, but the material of Example 2 was subjected to lower nip pressures during composite fabrication. Further, the adhesion between the film and substrate is more durable when Example 2 is compared against Example 1.

The present invention entails a film comprising an EMA and co-polyester thermoplastic admixed with a compatibilizer and extruded at a temperature at least 10% higher than the melt temperature, which in turn provides the co-polyester film with durable adhesion properties in addition to good breathability as seen in Table 1. It is within the purview of the invention that the enhanced film be employed in hygiene applications, industrial, and medical applications. Hygiene applications includes, but are not limited to, backsheet, topsheet, and/or internal construction layers of absorbent articles such as found in diapers and sanity napkins.

From the foregoing, it will be observed that numerous modifications and variations can be affected without departing from the true spirit and scope of the novel concept of the present invention. It is to be understood that no limitation with respect to the specific embodiments illustrated herein is intended or should be inferred. The disclosure is intended to cover, by the appended claims, all such modifications as fall within the scope of the claims.

TABLE 1

| Material | Basis Weight (gsm) | MVTR | Peel Strength |
|---|---|---|---|
| Example 1 | 110 | 475 | Not durable |
| Example 2 | 110 | 679 | Durable |

What is claimed is:

1. A method of forming a co-polyester blended film comprising the steps oft
  a. providing a co-polyester polymer;
  b. providing an ethyl methyl acrylate polymer;
  c. incorporating by thorough admixing at least one compatibilizer with the co-polyester polymer and ethyl methyl acrylate polymer to form a mixture having no more than about 1.0%, by weight, of any antioxidant compound, and
  d. extruding the mixture into a film at a temperature at least 10% higher than the melt temperature of the co-polyester polymer.

2. A method of forming a co-polyester blended film comprising the steps of:
  a. providing a co-polyester polymer;
  b. providing an ethyl methyl acrylate polymer;
  c. incorporating by thorough admixing at least one compatibilizer with the co-polyester polymer and ethyl methyl acrylate polymer to form a mixture having no more than about 1.0%, by weight, of any antioxidant compound, and
  d. extruding the mixture into a film at a temperature at least 10% higher than the melt temperature of the co-polyester polymer, and e. depositing the film onto a base material to from a liquid-barrier composite material.

3. A method of forming a co-polyester blended film according to claim 1 wherein the at least one compatibilizer is maleic anhydride modified polyethylene.

4. A method of forming a co-polyester blended film according to claim 1 wherein the at least one compatibilizer is ethylene acrylate copolymer.

5. A method of forming a co-polyester blended film according to claim 2 wherein the at least one compatibilizer is maleic anhydride modified polyethylene.

6. A method of forming a co-polyester blended film according to claim 2 wherein the at least one compatibilizer is ethylene acrylate copolymer.

7. A co-polyester blended film made according to the method of claim 1.

8. A co-polyester blended film made according to the method of claim 2.

9. A liquid-barrier composite material made according to the method of claim 1.

10. A liquid-barrier composite material made according to the method of claim 2.

11. A topsheet made according to the method of claim 1 wherein the topsheet is configured as part of a hygiene article.

12. A topsheet made according to the method of claim 2 wherein the topsheet is configured as part of a hygiene article.

13. A backsheet made according to the method of claim 1 wherein the backsheet is configured as part of a hygiene article.

14. A backsheet made according to the method of claim 2 wherein the backsheet is configured as part of a hygiene article.

* * * * *